(12) United States Patent  
Hanson et al.

(10) Patent No.: US 8,457,471 B2  
(45) Date of Patent: *Jun. 4, 2013

(54) MULTIMEDIA HOME NETWORK COMPUTER

(75) Inventors: Mark Hanson, San Jose, CA (US); Isao Murase, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1252 days.

This patent is subject to a terminal disclaimer.

(21) Appl. No.: 12/256,641

(22) Filed: Oct. 23, 2008

(65) Prior Publication Data

US 2009/0041435 A1   Feb. 12, 2009

Related U.S. Application Data

(63) Continuation of application No. 10/885,559, filed on Jul. 6, 2004, now Pat. No. 7,734,155.

(60) Provisional application No. 60/527,737, filed on Dec. 8, 2003.

(51) Int. Cl.  
    *H04N 9/80* (2006.01)

(52) U.S. Cl.  
    USPC ............... 386/241; 700/19; 700/65; 700/1

(58) Field of Classification Search  
    USPC ................... 386/241; 700/19, 65, 1  
    See application file for complete search history.

(56) References Cited

U.S. PATENT DOCUMENTS

| | | | | |
|---|---|---|---|---|
| 5,829,044 | A * | 10/1998 | Sono | 711/156 |
| 6,271,837 | B1 * | 8/2001 | Naiff | 715/716 |
| 6,469,633 | B1 * | 10/2002 | Wachter | 340/4.37 |
| 6,766,426 | B1 * | 7/2004 | Sugiyama | 711/154 |
| 7,154,822 | B2 * | 12/2006 | Higashi | 369/47.13 |
| 7,734,155 | B2 * | 6/2010 | Hanson et al. | 386/241 |
| 2003/0068157 | A1 * | 4/2003 | Kushibe et al. | 386/69 |
| 2004/0255340 | A1 * | 12/2004 | Logan | 725/145 |
| 2007/0220279 | A1 * | 9/2007 | Northcutt et al. | 713/193 |

* cited by examiner

*Primary Examiner* — Thai Tran  
*Assistant Examiner* — Girumsew Wendmagegn  
(74) *Attorney, Agent, or Firm* — Sony Corporation

(57) ABSTRACT

A home entertainment network has a computer with a multi-DVD changer which holds plural DVDs onto which content from an hard disk drive (HDD) can be transferred for storage. Also, DVD content can be ripped to the HDD, and multiple copies of home videos and photographs on the HDD can be made onto several disks simultaneously.

21 Claims, 4 Drawing Sheets

System

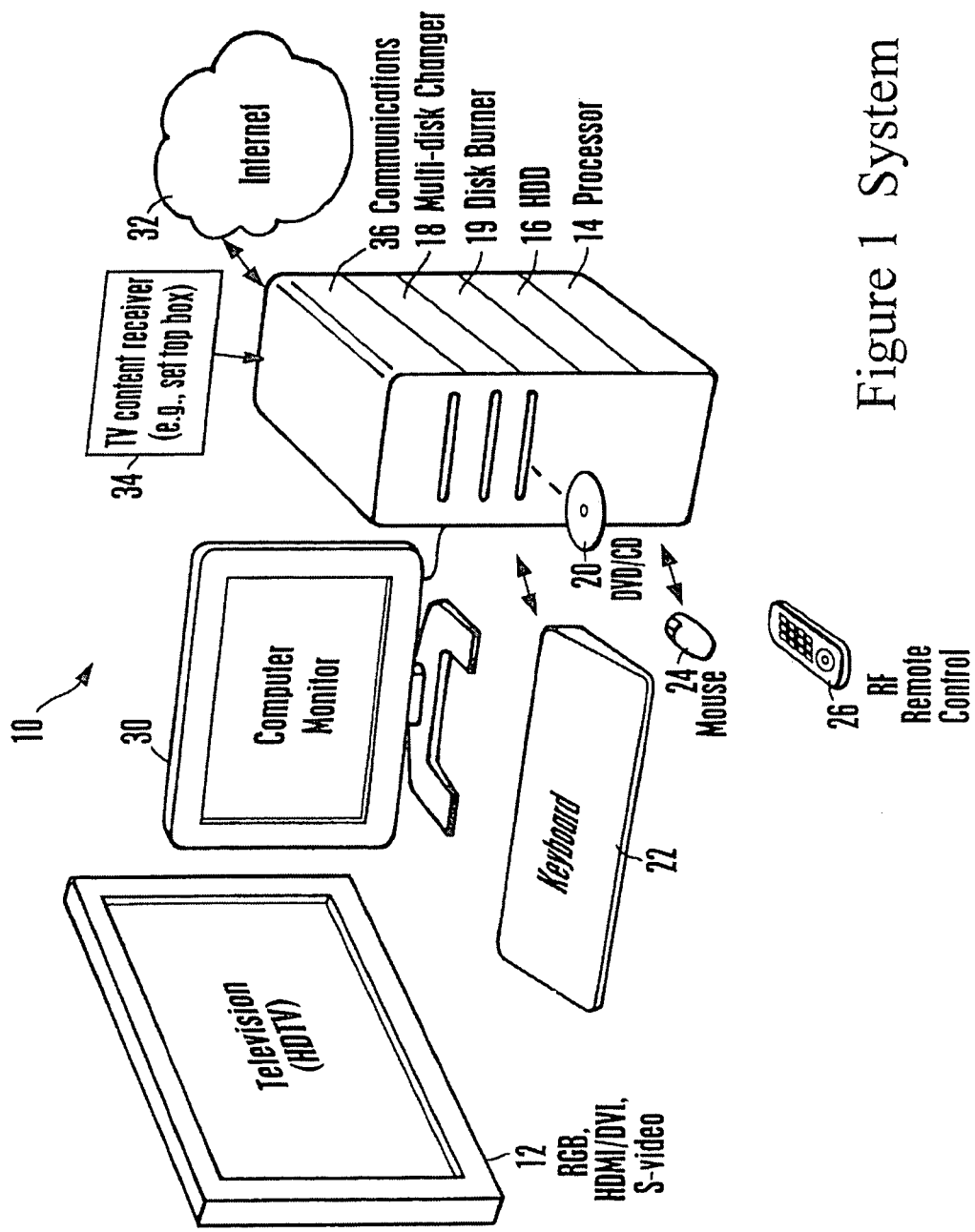
Figure 1 System

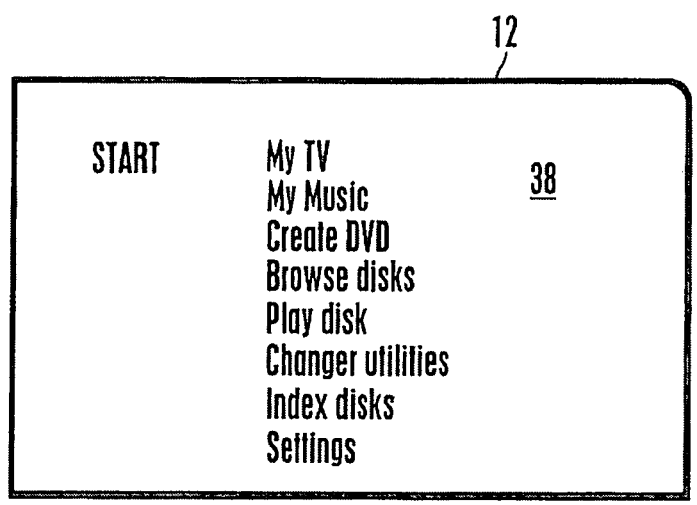
Figure 2  start screen
Figure 3  browse disk screen
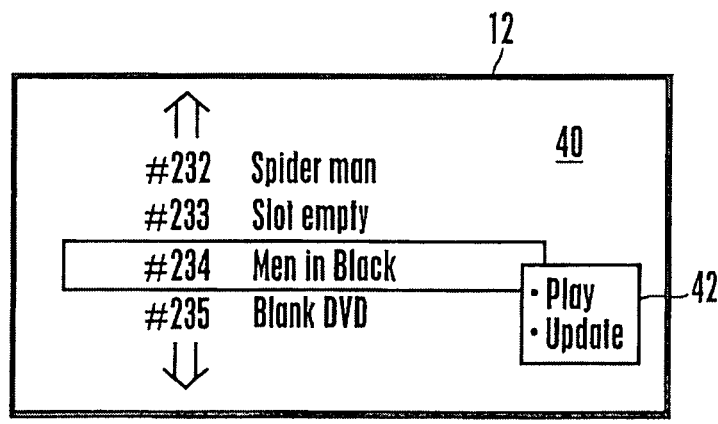

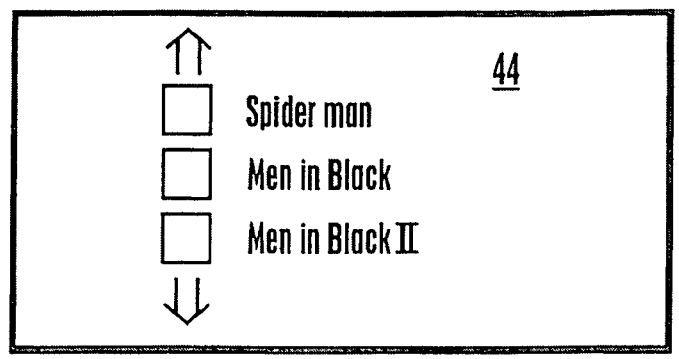
Figure 4  play DVD screen
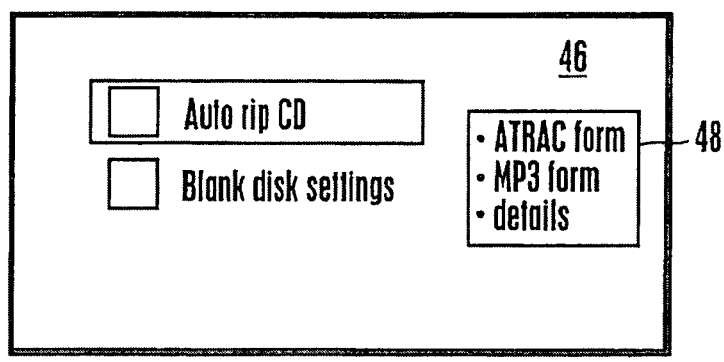
Figure 5  changer utility screen
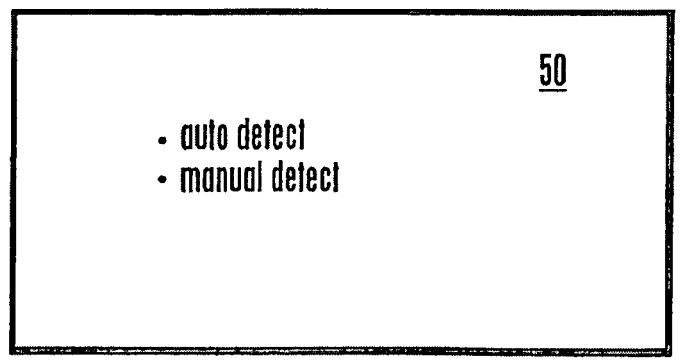
Figure 6  index disks screen

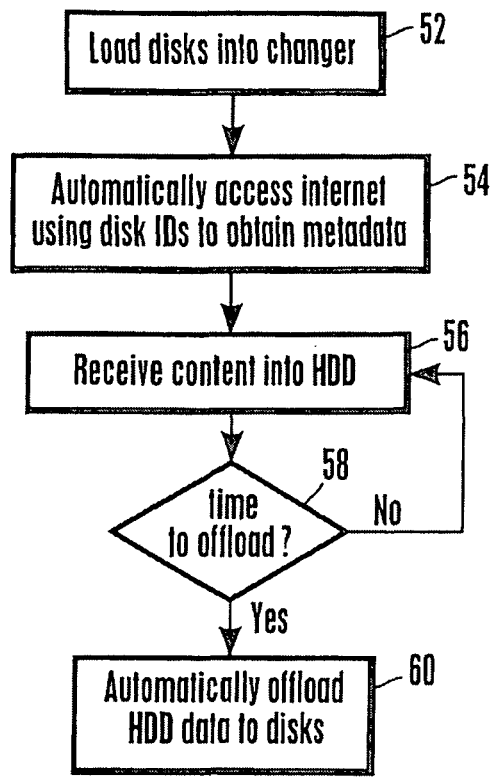
Figure 7
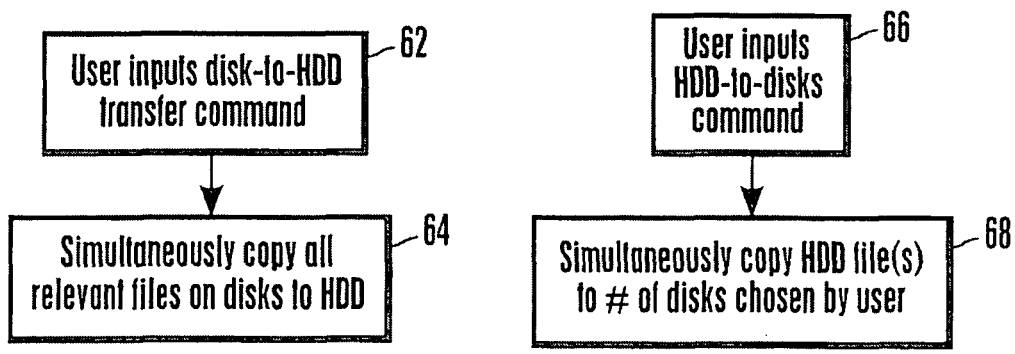
Figure 8
Figure 9

MULTIMEDIA HOME NETWORK COMPUTER

RELATED APPLICATIONS

The present application is a continuation of U.S. patent application Ser. No. 10/885,559, filed on Jul. 6, 2004, which claims priority from U.S. provisional application Ser. No. 60/527,737, filed on Dec. 8, 2003.

FIELD OF THE INVENTION

The present invention relates generally to home entertainment networks.

BACKGROUND OF THE INVENTION

Home entertainment systems enable viewers to access entertainment content from several sources, including TV content from cable or satellite, music from CDs, and movies on DVDs and videotape. Also, many systems include personal video recorders (PVR), which enable users to record televised content onto hard disk drives (HDD) for later viewing.

The present invention recognizes that home entertainment systems which provide the above capabilities open avenues to increased functionality, enabling users to do more things than simply view whatever content happens to be broadcast. For instance, PVRs enable viewers to record television programs for later viewing at convenient times, without having to sit through commercials. Advanced digital systems such as DVDs can enable viewers to view non-public content such as home videos and digital pictures. In short, viewers can now select a variety of content from many sources for viewing and copying.

But the variety in content and media type, while opening avenues for more entertainment options, also poses content management challenges. Currently, content in a home entertainment system must be managed media type-by-media type, but this is inconvenient because it forces the user to manage DVD content separately from PVR content, etc. Also, it may be desirable for access speed and convenience reasons to play or store content that is stored on one type of media using a component that is associated with another type of media. For example, as recognized herein it might be desirable to offload content that has been recorded in a PVR to DVD, to free up space on the HDD of the PVR. Or, it might be desirable to transfer music to a PVR HDD from a CD for quick access and vice-versa for storage capacity reasons. Still farther, it might be desired to make several copies of home movies or photographs for friends and family without repeating the copying process for each and every copy sought to be made.

SUMMARY OF THE INVENTION

A home entertainment system can include a video monitor and a computer communicating with the video monitor. The system also has a disk changer which holds multiple optical disks. A hard disk drive (HDD) is associated with the computer. Content from the HDD is automatically transferred to at least one optical disk in the disk changer if a predetermined data storage condition in the HDD has been met.

The video monitor can be a TV monitor such as a HDTV monitor, and the computer can include a computer monitor. The optical disks can include CDs and/or DVDs. The computer may be controlled to cause content from plural optical disks to be substantially simultaneously copied onto the HDD, and also to copy content on the HDD onto plural optical disks substantially simultaneously.

In some embodiments the monitor displays a browse disks screen that can be used by a person manipulating a remote control device to scroll through titles of content stored on optical disks in the disk changer. The computer may be connected to the Internet to facilitate (using, e.g., disk IDs) accessing the Internet to download metadata pertaining titles in the disk changer. Also, the monitor can display an index disks screen usable by a person manipulating a remote control device to automatically index content contained in the optical disks in the disk changer.

In another aspect, a home entertainment system includes a TV and a portable computer communicating with the TV and with a disk changer. The system includes means for automatically downloading, from the Internet to the system, metadata pertaining to at least one video content stored on at least one optical disk in the disk changer.

In still another aspect, an entertainment system includes a portable computer and a HDTV wirelessly communicating with the computer. A disk changer also communicates with the computer. The disk changer is configured to hold plural optical disks, at least some of which can be DVDs. A hard disk drive (HDD) also communicates with the computer.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;
FIG. 2 is a screen shot of the start screen;
FIG. 3 is a screen shot of the browse disk screen;
FIG. 4 is a screen shot of the play DVD screen;
FIG. 5 is a screen shot of the changer utility screen;
FIG. 6 is a screen shot of the index disks screen;
FIG. 7 is a flow chart of overall management logic;
FIG. 8 is a flow chair of the logic for copying optical disk content to HDD; and
FIG. 9 is a flow chart of the logic for copying HDD content to optical disk.

DETAILED DESCRIPTION OF THE PREFERRED EMBODIMENT

Referring initially to FIG. 1, a system is shown, generally designated 10, that includes a television (TV) 12 such as but not limited to a high definition television (HDTV) and a computer 14. The computer 14 accesses one or more hard disk drives (HDD) 16. The computer 14 also accesses a disk changer 18 that can include a DVD player and a disk burner 19 and that can hold multiple (e.g., four hundred) optical disks 20 including compact disks (CDs), digital video disks (DVDs), and other types of disks such as Blue Ray disks and super-audio CDs. Input can be provided to the computer 14 by a keyboard 22 and/or a mouse 24 and/or other input device such as a voice recognition device. Also, a remote control device 26 can input commands to the computer 14 and preferably to the TV 12. The computer 14 can output the display screens. shown below to a computer monitor 28 and to the TV 12 if desired.

As shown in FIG. 1, the computer 14 can communicate with the Internet 32, for purposes to be shortly disclosed. The computer 14 can also communicate with a TV content receiver 34, such as a set-top box or a satellite receiver or a terrestrial TV signal antenna.

In accordance with the present invention, the communication paths can be wired, but more preferably are wireless and more preferably still are radiofrequency (rf) such as Bluetooth paths, so that line-of-sight is not required, although infrared (IR) communication can be used if desired. Accordingly, the computer 14 can include a wireless rf communication module 36, and both the mouse 24 and keyboard 22 can be wireless. The remote control device 26 also can be wireless, preferably rf wireless. Moreover, the link between the computer 14 and TV 12 can be wireless and can use conventional red-green-blue (RGB) protocols, or the link can use S-video protocols or component connections, or the link can use High Definition Multimedia Interface (HDMI)/Digital Visual Interface (DVI) protocols. While FIG. 1 shows that the computer 14 communicates directly with the TV 12, it is to be understood that the communication path between the computer 14 and TV 12 alternatively can go through the content receiver 34, particularly if the content receiver 34 is a set-top box.

While the non-limiting illustration in FIG. 1 shows that the computer 14 can be housed with the disk changer 18 and various other components, it is to be understood that the computer 14 may be housed separately from the disk changer 18 and some of the other components shown in FIG. 1 and still communicate with the disk changer 18 and the other components. In one embodiment, for instance, the computer 14 can be a portable computer such as a PC or laptop computer, and can incorporate the HDD 16. Or, the HDD 16 may be implemented in a personal video recorder (PVR) that is separate from the computer 14. As a non-limiting example, the computer 14 can be a Vaio® laptop computer made by Sony Corp. and programmed to undertake the inventive aspects disclosed herein.

Now referring to FIG. 2, a non-limiting exemplary start-up screen 38 which may be presented upon power-on of the system 10 can be seen. The screen 38 shown in FIG. 2, like the other screens described further below, can be presented on the TV 12, or on the monitor 28, or both. As shown, the start up screen 38 may include a menu of choices from which the user can select by, e.g., manipulating up and down arrows on the remote control device 26 and, when the desired selection is highlighted, depressing an "enter" button on the remote control device 26. Or, the keyboard 22 and/or mouse 24 of the computer 14 can be used. In either case, the actions discussed below can be controlled by the computer 14 in response to user selections on the screens.

The non-limiting start up screen menu can include a "my TV" selection, which, if selected, causes a TV channel list such as an electronic program guide (EPG) to be displayed from which a user can select a channel for display on the TV 12. Also, using the "my TV". selection a user can select a particular program for automatic recording on the HDD 14 for later viewing, i.e., the system 10 can be used to time-shift televised content.

The start up screen 38 shown in FIG. 2 can also include a "my music" selection, which, if selected, causes a list of CDs that might be present in the disk changer 18 to be displayed. Also, music titles that might be stored on the HDD as well as TV channels that play only music can be displayed on the list, so that a user can scroll through both recorded music titles and TV music channels to select a desired title to be played on, e.g., the audio speakers of the TV 12. If a CD is selected, the DVD player associated with the disk changer 18 can play the selected CD.

Additionally, the start up screen 38 can include a selection to enable the user to select a blank CD or DVD in the changer 18 and create an audio CD or a CD-ROM (or a video DVD or DVD-ROM) and, if desired, define a ROM-defined disk as a drive of the computer 14. Further, the start up menu can include a "browse disks" selection, described further below in reference to FIG. 3, a "play disk" selection, described further below in reference to FIG. 4, a "changer utilities" selection, described further below in reference to FIG. 5, and an "index disks" selection, described further below in reference to FIG. 6. System settings can be reviewed by selecting the "settings" selection on the start up screen 38.

FIG. 3 shows the "browse disks" screen 40 that is displayed when the "browse disks" selection on the start up screen 38 shown in FIG. 2 is selected. As shown, a list of movie titles that are recorded on the DVDs in the disk changer 18 is displayed. For example, the movie "Spiderman" is indicated as being on a DVD in slot #232 of the DVD changer. Slot #233 is indicated as being empty, and a DVD bearing the movie "Men in Black" is in slot #234. A blank DVD is indicated as being in slot #235. FIG. 3 indicates that the user has currently placed the cursor on the line indicating "Men in Black", slot #234. In any case, using the browse disks screen a user can review the contents of each slot in the disk changer 18.

A play window 42 may also be superimposed on the browse screen 40. As shown, the play window 42 can include an option to "play", which if selected causes the highlighted selection in the browse screen 40 to be played by the DVD player of the disk changer 18 for presentation on the TV 12. Also, an "update" selection can be selected to cause the computer 14 to automatically access metadata from the Internet pertaining to the highlighted title and to store the metadata on the associated DVD using, e.g., the DVD burner 19. This metadata can include the year and director of the movie, background content/videos, etc. To update the DVD the computer 14 uses the ID of the selected disk and connects to a content provider Web site using, as entering argument, the disk ID. In the case of a selected disk that is a CD, the user can also be presented with a menu choice to copy the content to the HDD 14.

When the "play DVD" selection is made from the start up screen 38 shown in FIG. 2, the screen 44 shown in FIG. 4 can be presented. As shown, the screen 44 can include a menu of movie titles on DVDs in the disk changer 18. No unused changer slots or blank DVDs are shown. A user can scroll through the list (or input the first letter or two of a title to cause the list to jump to that title) and select a title for play.

FIG. 5 shows a non-limiting "changer utility" screen 46. Using the screen 46, a user can select "auto rip CD", which in turn causes a window 48 to be presented from which the user can select a particular audio file format, e.g., ATRAC or MP3. Upon selection of the format and the auto rip function, music files from CDs or DVDs in the disk changer 18 are encoded in the selected format and automatically copied onto the HDD 16 shown in FIG. 1. If desired, all music files stored on disks in the disk changer 18 can be ripped to the HDD 16, or only selected files as desired by the user. The "detail settings" selection can be used to define bit rates, folder locations, and other settings. Selecting the "blank disk" selection enables a user to view the format and other settings of blank disks in the disk changer 18.

An exemplary index disks screen 50 is shown in FIG. 6. As shown, an auto detect function can be selected, in which the system 10 scans all disks for type (e.g., audio CD, CD-ROM, ATRAC3 CD, MP3 CD, DVD video, DVD-ROM, writable CD, writable DVD) and disk ID. The system 10 correlates the titles and/or disk IDs to the appropriate changer slot numbers.

This is recommended for the first time use after the disk changer has been loaded with disks. Also, the system 10 can scan each disk for additional metadata to determine, based on the disk ID, whether any metadata is different from what is indicated by the latest index database as might be accessible on a content provider site on the Internet. If it is, the computer 14 can automatically obtain new metadata, if any, from the Internet in accordance with principles discussed above. Alternatively, the user can select the "manual detect" function, which requires the user to manually enter the slot number and disk ID for each disk that has been loaded into the disk changer 18. The user can be prompted to make this selection if, for instance, metadata cannot be detected by the system 10. The detection process may be canceled at any time by the user if the user wants to immediately play content, and periodically the user can be prompted to resume the detection process.

FIG. 7 shows further operational logic of the system 10 in non-limiting flow chart format. Commencing at block 52 the disks 20 are loaded into the disk changer 18. At block 54 the Internet can be accessed automatically by the computer 14 to obtain disk metadata using, e.g., disk IDs in accordance with principles set forth above. The computer 14 can not only respond to an "auto detect" command from the screen 50 shown in FIG. 6 to do this, but can also periodically obtain metadata from the Internet without any user command.

Block 56 indicates that content, such as televised content, digital photographs, digital home videos, etc. can be received on the HDD 16. Periodically the computer 14 determines, at decision diamond 58, whether a predetermined data storage condition in the HDD 14 has been met, and if so the logic moves to block 60 to automatically offload content from the HDD 14 to one or more disks in the disk changer 18. The data storage condition can be, without limitation, reaching a predetermined fraction of the total capacity of the HDD 14.

FIGS. 8 and 9 represent some of the functions discussed above. Specifically, block 62 of FIG. 8 indicates that the user can input a command to copy disk content such as audio files to the HDD 14, with the command being carried out at block 64 for all relevant disks 20 substantially simultaneously. By "substantially simultaneously" is meant that in a single seamless process, all music on all CDs or just those selected by the user can be copied to the HDD 14 by, e.g., multiplexing among the disks 20.

Block 66 of FIG. 9 indicates that a user can enter a command to offload or to copy content from the HDD 14 to one or more disks 20. At block 68 the selected HDD files can be copied to any number of disks 20 in the changer 18 substantially simultaneously. For instance, the system 10 permits a user to select a home video file on the HDD 14, then select a number of disks the user wishes to copy the video to. The video would then be copied to the selected number of disks in the changer 18.

While the particular MULTIMEDIA HOME NETWORK COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

We claim:

1. A home entertainment system, comprising:
   at least a first video monitor;
   at least one computer communicating with the first video monitor;
   at least one disk changer holding multiple optical disks; and
   at least one hard disk drive (HDD) associated with the computer, content from the HDD being automatically transferred to at least one optical disk in the disk changer if a predetermined data storage condition in the HDD has been met.

2. The system of claim 1, wherein the first video monitor is a TV monitor, and the computer includes a computer monitor.

3. The system of claim 2, wherein the TV monitor is a high definition TV (HDTV) monitor.

4. The system of claim 3, wherein the optical disks include at least one DVD.

5. The system of claim 1, wherein the computer can be controlled to copy content on the HDD onto a plurality of optical disks substantially simultaneously.

6. The system of claim 1, wherein the monitor can display a browse disks screen usable by a person manipulating a remote control device to scroll through titles of content stored on optical disks in the disk changer.

7. The system of claim 1, wherein the computer is connectable to the Internet and the computer facilitates accessing the Internet to download metadata pertaining to at least one title on at least one optical disk in the disk changer.

8. The system of claim 7, wherein the computer automatically accesses the Internet using at least in part at least one identification of the at least one optical disk in the disk changer to download the metadata pertaining to the optical disk.

9. The system of claim 1, wherein the monitor can display an index disks screen usable by a person manipulating a remote control device to automatically index content contained in the optical disks in the disk changer.

10. A home entertainment system, comprising:
    at least one TV;
    at least one portable computer communicating with the TV;
    at least one disk changer communicating with the computer, the disk changer holding multiple optical disks;
    means for automatically downloading, from the Internet to the system, metadata pertaining to at least one video content stored on at least one optical disk in the disk changer; and
    at least one hard disk drive (HDD) associated with the computer, content from the HDD being automatically transferred to at least one optical disk in the disk changer if a predetermined data storage condition in the HDD has been met.

11. The system of claim 10, wherein the TV is a high definition TV (HDTV).

12. The system of claim 11, wherein the optical disks include at least one DVD.

13. The system of claim 10, wherein the computer can be controlled to copy content on the HDD onto a plurality of optical disks substantially simultaneously.

14. The system of claim 10, wherein the computer can cause a display of a browse disks screen to be presented, the browse disks screen being usable by a person manipulating a remote control device to scroll through titles of content stored on optical disks in the disk changer.

15. The system of claim 10, wherein the TV can display an index disks screen usable by a person manipulating a remote control device to automatically index content contained in the optical disks in the disk changer.

16. An entertainment system comprising:
at least one portable computer;
at least one high definition TV (HDTV) wirelessly communicating with the at least one portable computer;
at least one disk changer communicating with the at least one portable computer, the at least one disk changer configured to hold multiple optical disks, at least one of the multiple optical disks being DVD; and
at least one hard disk drive (HDD) communicating with the at least one portable computer,
wherein content from the at least one HDD is automatically transferred to at least condition in the at least one HDD has been met.

17. The system of claim 16, wherein the at least one portable computer can be controlled to copy content on the at least one HDD onto a plurality of the multiple optical disks substantially simultaneously.

18. The system of claim 16, wherein at least one of: the at least one portable computer, and the at least one HDTV, can display a browse disks screen usable by a person manipulating a remote control device to scroll through titles of content stored on the multiple optical disks in the at least one disk changer.

19. The system of claim 16, wherein the at least one portable computer is connectable to the Internet and the at least one portable computer facilitates accessing the Internet to download metadata pertaining to at least one title on at least one of the multiple optical disks in the disk changer.

20. The system of claim 19, wherein the at least one portable computer automatically accesses the Internet using at least identification of the at least one of the multiple optical disks in the at least one disk changer to download the metadata.

21. The system of claim 16, wherein the at least one HDTV under control of the at least one portable computer can display an index disks screen usable by a person manipulating a remote control device to automatically index content contained in the multiple optical disks in the at least one disk changer.

* * * * *